March 25, 1924.
J. STIRISS
1,487,983
PORTABLE ELECTRIC FLASH LAMP
Filed Oct. 5, 1922
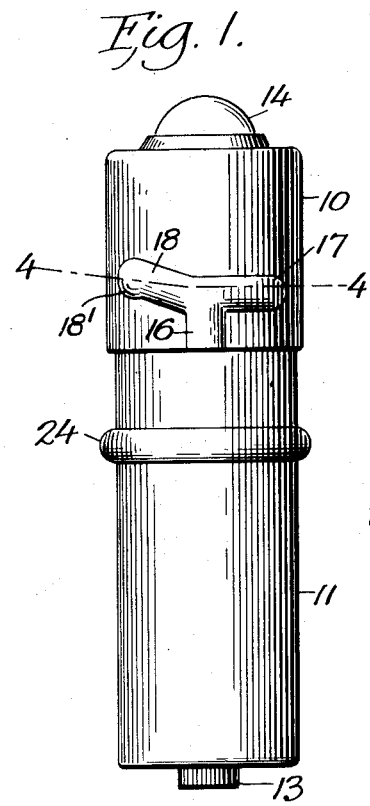
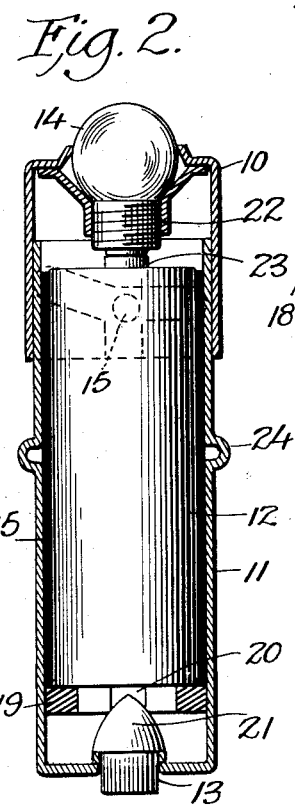
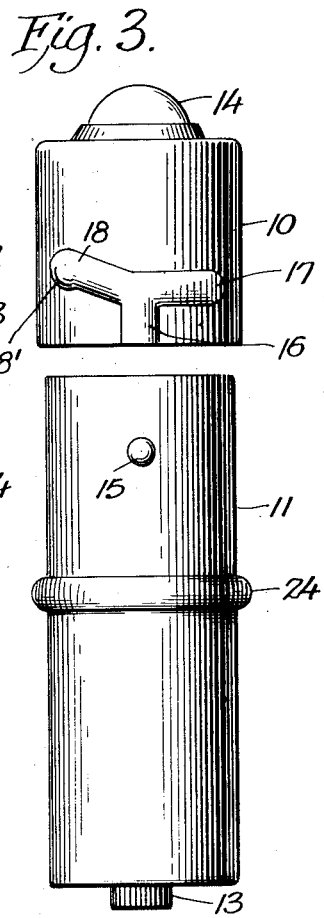
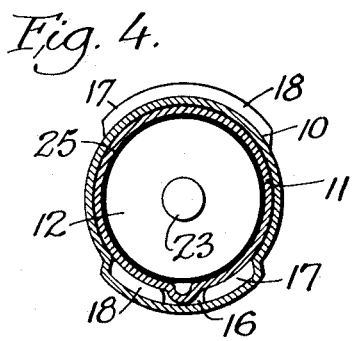
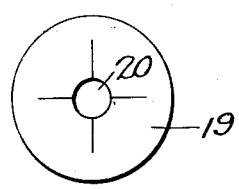
INVENTOR.
Jacob Stiriss,
BY
James P. Duhamel,
ATTORNEY.

Patented Mar. 25, 1924.

1,487,983

UNITED STATES PATENT OFFICE.

JACOB STIRISS, OF ARVERNE, NEW YORK.

PORTABLE ELECTRIC FLASH LAMP.

Application filed October 5, 1922. Serial No. 592,511.

*To all whom it may concern:*

Be it known that I, JACOB STIRISS, a resident of Arverne, Queens County, New York State, and a citizen of the United States, have invented certain new and useful Improvements in Portable Electric Flash Lamps, of which the following is a specification.

This invention relates to portable electric lamps of the cylindrical type comprising a battery and electric bulb, and the object of the invention is to provide an inexpensive and convenient means by which contacts may be closed by the fingers of the hand that holds the lamp to throw the battery into the circuit for an instant flash or for permanent illumination, and to instantly disconnect the circuit to render the lamp inoperative.

These and other details and objects of the invention are more fully described in the following specification, set forth in the appended claims and illustrated in the accompanying drawings, wherein:

Figure 1 is a side elevation of the improved lamp.

Fig. 2 is a vertical sectional view of the same.

Fig. 3 is an elevation showing the parts of the casing separated.

Fig. 4 is a cross sectional view through the line 4—4 of Fig. 1.

Fig. 5 is a plan view of the insulating washer.

A casing is provided to obtain the parts of the lamp and comprises the sections 10 and 11, the latter adapted to contain the battery 12, from which it is insulated, and carrying the contact plunger 13 that throws the battery and casing in circuit and plays through the bottom of section 11 to be accessible for operation.

The section 10 is a cap that carries the lamp 14 and fits over the section 11 and is connected with the same by means of what is substantially the bayonet-joints comprising the studs 15 pressed outward from the section 11 and the channels 16 in the cap into which the studs enter and are adapted to pass into lateral branches 17 concentric with the circumference of the casing sections of the offset branches 18 and are deflected upward and have sockets 18' at their outer ends to receive and retain the stud 15.

The lower end of the battery 12 rests on and is supported by the washer 19 of a nonconducting material, such as soft rubber, and having a perforation 20 and radial slits that permit the pointed end 21 of the plunger 13 to penetrate the same and make the electrical contact with the battery to complete the circuit.

The stem 22 of the lamp 14 makes contact with the button 23 of the battery when the cap is put upon the casing 11 and held there when the cap is partly rotated to the left and the studs 15 secured in the concentric branches 17, and the lamp is now ready for the operation of the circuit closer 13 which, when pressed inward, causes its point 21 to crowd past the walls of the opening 20 and complete the electric circuit of battery, casing, cap and stem 22 and illuminating the lamp.

The illumination of the lamp will continue only so long as the plunger 13 is depressed and when released the walls of the washer will force it outward and destroy the circuit.

When it is desired to obtain a continuous illumination the cap 10 is turned to the right and the studs 15 will enter the branch channel 18, and, acting on its walls, will force the cap further down on the casing carrying down with it the battery 12 until it meets the point 21 when the circuit is closed and the cap is held at this point by the stud lodging in the sockets 18', securing continuous illumination.

These operations may all be performed by the fingers of the hand that carries the lamp and allows the free use of the other hand for a different purpose. An integral ring 24 is formed in the section 11 to afford a firm grip on the lamp while the two parts are being operated independently and the battery is surrounded by insulating material 25.

It is obvious that the parts may be otherwise arranged or modified without departing from the essential features above described and within the scope of the appended claims.

I claim:

1. In a portable electric lamp, the combination of a casing comprising independent sections, a battery adapted to be shifted in one of the sections, a circuit closing plunger adapted to contact with the battery, flexible separating means between the battery and plunger, and means operable by the sections to close the circuit between the battery and plunger.

2. In a portable electric lamp, the combination of a casing comprising independently moving sections, a battery adapted to be shifted by the movement of one of the sections, a lamp carried by the latter section and making contact with one end of the battery a flexible support for the battery, a contact plunger adapted to penetrate the support when the battery is shifted, and means for holding the battery in its shifted position.

3. In a portable electric lamp, the combination of a casing comprising telescopic sections, a flexible washer in the bottom of one of the sections, a contact plunger beneath said washer, a battery resting on the washer, and a channel in the other section of the casing and adapted to receive a stud from the first section to depress the battery and cause the plunger to penetrate the washer and complete a circuit.

4. In a portable electric lamp, the combination of a casing made up of two telescopic sections, an insulated battery in one of the sections, a flexible penetrable washer supporting the battery, a plunger in the battery section adapted to penetrate the washer and electrically connect the battery with its section, and a stud at the upper end of the latter section adapted to play in an inclined channel in the upper movable section to depress the battery to close the circuit.

5. In a portable electric lamp, the combination of a stationary casing section, a battery insulated and contained within the same, a flexible washer supporting the battery, a circuit closing plunger adapted to penetrate the washer and establish a circuit between the battery and casing section, studs at the upper end of said section, a movable section with inclined channels to receive the studs, and a lamp carried by the movable section and adapted to depress the battery when the said movable section is turned and the inclined channels and studs cause the sections to telescope.

In testimony whereof I hereunto affix my signature.

JACOB STIRISS.